(12) United States Patent
Tankard et al.

(10) Patent No.: US 9,887,657 B2
(45) Date of Patent: Feb. 6, 2018

(54) METHOD OF OPERATING A SWITCHED RELUCTANCE MACHINE

(71) Applicant: NIDEC SR DRIVES LTD., North Yorkshire (GB)

(72) Inventors: Michael Paul Tankard, Harrogate (GB); Paul Andrew Sykes, Leeds (GB); Ian Jordison, Harrogate (GB)

(73) Assignee: NIDEC SR DRIVES, LTD, Harrogate (GB)

( * ) Notice: Subject to any disclaimer, the term of this patent is extended or adjusted under 35 U.S.C. 154(b) by 0 days.

(21) Appl. No.: 15/291,992

(22) Filed: Oct. 12, 2016

(65) Prior Publication Data

US 2017/0117839 A1 Apr. 27, 2017

(30) Foreign Application Priority Data

Oct. 23, 2015 (GB) .................................. 1518777.6

(51) Int. Cl.
| | |
|---|---|
| *H02P 6/16* | (2016.01) |
| *H02P 25/092* | (2016.01) |
| *H02P 29/024* | (2016.01) |
| *H02P 1/16* | (2006.01) |
| *H02P 27/06* | (2006.01) |

(52) U.S. Cl.
CPC ............ *H02P 25/092* (2016.02); *H02P 1/163* (2013.01); *H02P 6/16* (2013.01); *H02P 27/06* (2013.01); *H02P 29/024* (2013.01); *H02P 29/0241* (2016.02)

(58) Field of Classification Search
CPC ..................................................... H02P 25/092
See application file for complete search history.

(56) References Cited

U.S. PATENT DOCUMENTS

| | | | |
|---|---|---|---|
| 5,973,462 A | 10/1999 | Kalpathi et al. | |
| 9,069,025 B2 | 6/2015 | Schaefer et al. | |
| 2015/0028788 A1* | 1/2015 | Wai | ..................... H02P 25/0925 318/504 |
| 2015/0031050 A1 | 1/2015 | Liu et al. | |

FOREIGN PATENT DOCUMENTS

| | | |
|---|---|---|
| EP | 0635931 | 1/1995 |
| JP | 2005102384 | 4/2005 |
| JP | 2005151664 | 6/2005 |
| WO | WO 2014/121557 | 8/2014 |

OTHER PUBLICATIONS

Stepheson et al., "The Characteristics, Design and Applications of Switched Reluctance Motors and Drives", PCIM'93, Jun. 21-24, 1993, pp. 1-68, Conference & Exhibition, Seminar 5, Nürnberg, Germany.

* cited by examiner

*Primary Examiner* — Shawki S Ismail
*Assistant Examiner* — Muhammad S Islam
(74) *Attorney, Agent, or Firm* — Haynes and Boone, LLP (57) ABSTRACT

A controller for a switched reluctance machine is operated to close a switch which would otherwise be open so as to connect a phase winding to the DC link to which the winding is connected during other parts of the electrical cycle. This produces a condition which allows the insulation of the system to be monitored by applying a voltage between the DC link and ground.

16 Claims, 6 Drawing Sheets

METHOD OF OPERATING A SWITCHED RELUCTANCE MACHINE

CROSS REFERENCE TO RELATED APPLICATIONS

This patent application claims the benefit of and priority to United Kingdom Patent Application No. GB 1518777.6 filed Oct. 23, 2015 and entitled "METHOD OF OPERATING A SWITCHED RELUCTANCE MACHINE" which is hereby incorporated by reference in its entirety.

TECHNICAL FIELD

The present invention generally relates to switched reluctance machines and their operation. More particularly, although not exclusively, the present invention relates to facilitating the detection of insulation faults in the machine.

BACKGROUND

The characteristics and operation of switched reluctance systems are well known in the art and are described in, for example, "The characteristics, design and application of switched reluctance motors and drives" by Stephenson and Blake, PCIM'93, Nürnberg, 21-24 Jun. 1993, incorporated herein by reference.

SUMMARY

Figure 1:
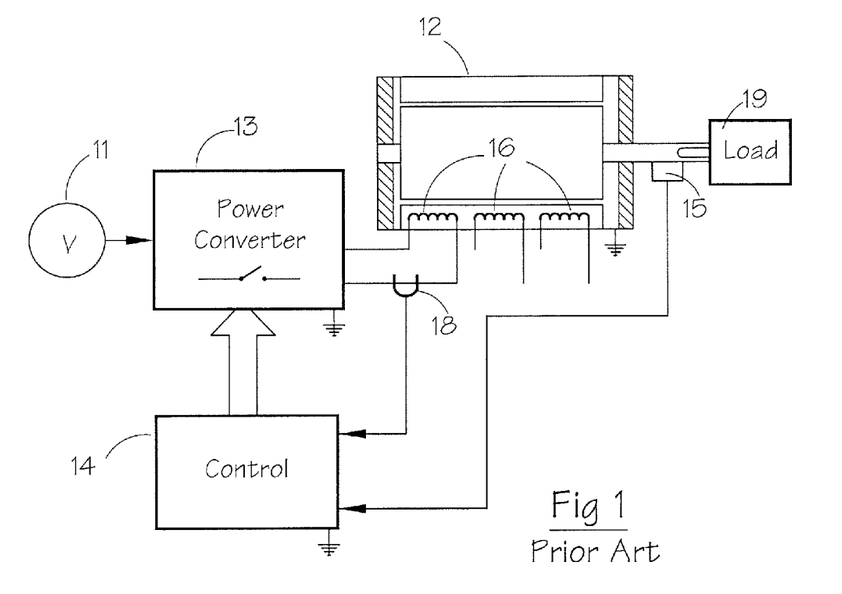
FIG. 1 shows the principal components of a switched reluctance drive system.

FIG. 1 shows a typical switched reluctance drive in schematic form, where the switched reluctance machine 12 is connected to a load 19. The DC power supply 11 can be either a battery or rectified and filtered AC mains or some other form of energy storage. The DC voltage provided by the power supply 11 is switched across the phase windings 16 of the machine 12 by a power converter 13 under the control of the electronic control unit 14. The switching must be correctly synchronised to the angle of rotation of the rotor for proper operation of the drive, and a rotor position detector 15 is typically employed to supply signals corresponding to the angular position of the rotor. The rotor position detector 15 may take many forms, including that of a software algorithm, and its output may also be used to generate a speed feedback signal. The presence of the position detector and the use of an excitation strategy which is completely dependent on the instantaneous position of the rotor leads to the generic description of "rotor position switched" for these machines.

In common with other electrical machines, the excitation coils are insulated from the frame of the machine by an insulation system which comprises one or more layers of insulation material. Typically, different parts of the machine have different types of insulation material, depending on the electrical and thermal conditions in these different parts. The overall aim of the insulation system is to isolate the electrical conductors from the frame of the machine which, for safety reasons, is typically electrically grounded so that anyone touching it is not exposed to potentially hazardous voltages. Similarly, the enclosures for the power electronics and control system are grounded. This grounding is shown schematically in FIG. 1.

Figure 2:
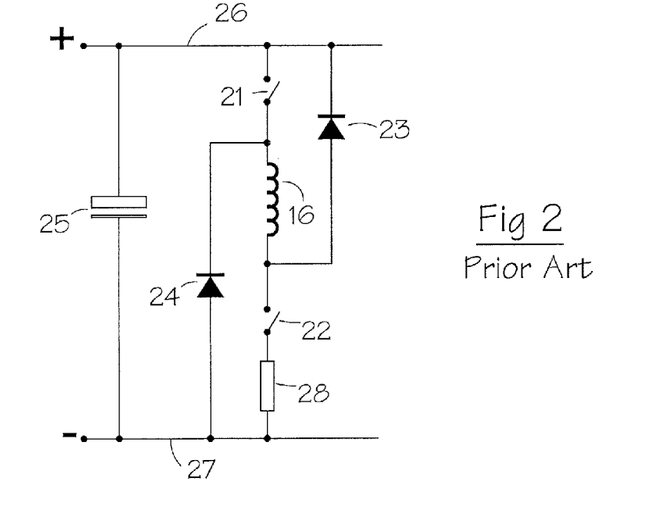
FIG. 2 shows a typical switching circuit for a power converter that controls the energisation of the phase windings of the machine of FIG. 1.
Figure 3:
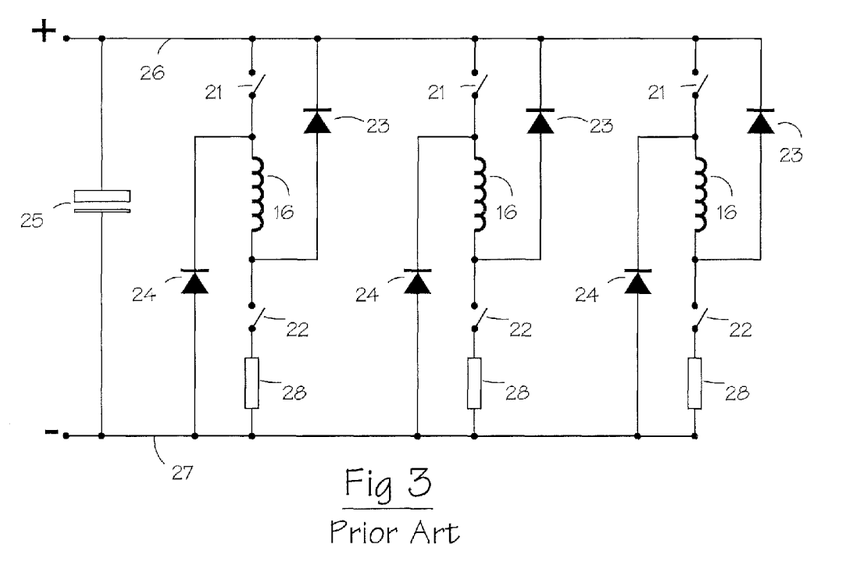
FIG. 3 shows a typical 3-phase switching circuit for a power converter.

Many different power converter topologies are known for this type of machine, several of which are discussed in the Stephenson paper cited above. One of the most common configurations is shown for a single phase of a polyphase system in FIG. 2, in which the phase winding 16 of the machine is connected in series with two switching devices 21 and 22 across the busbars 26 and 27. Busbars 26 and 27 are collectively known as the "DC link" of the converter. Energy recovery diodes 23 and 24 are connected to the winding to allow the winding current to flow back to the DC link when the switches 21 and 22 are opened. A low-value resistor 28 may be connected in series with the lower switch to act as a non-isolated, current-sense resistor. This is an alternative arrangement to the isolated current transducer 18 shown in FIG. 1. Polyphase systems typically use the appropriate number of the phase legs of FIG. 2 connected in parallel to supply the complete system, as shown in FIG. 3 for a 3-phase system.

A capacitor 25, known as the "DC link capacitor", is connected across the DC link to source or sink any alternating component of the DC link current (ie the so-called "ripple current") which cannot be drawn from, or returned to, the supply. In practical terms, the capacitor 25 may comprise several capacitors connected in series and/or parallel and, where parallel connection is used, some of the elements may be distributed throughout the converter.

In general, the phase winding is energised to effect the rotation of the rotor as follows. At a first angular position of the rotor (called the "turn-on angle", $\theta_{on}$), the controller 14 provides switching signals to turn on both switching devices 21 and 22. When the switching devices 21 and 22 are on, the phase winding is coupled to the DC link, causing an increasing magnetic flux to be established in the machine. The magnetic flux produces a magnetic field in the air gap which acts on the rotor poles to produce the motoring torque. The magnetic flux in the machine is supported by the magnetomotive force (mmf) which is provided by a current flowing from the DC supply 11 through the switches 21 and 22 and the phase winding 16. Current feedback is generally employed and the magnitude of the phase current is controlled by chopping the current by rapidly opening or closing one or both of switching devices 21 and/or 22. In motoring operation, the turn-on angle $\theta_{on}$ is often chosen to be the rotor position where the centre-line of an inter-polar space on the rotor is aligned with the centre-line of a stator pole, but may be some other angle.

In many systems, the phase winding remains connected to the DC link (or connected intermittently if chopping is employed) until the rotor rotates such that it reaches what is referred to as the "freewheeling angle", $\theta_{fw}$. When the rotor reaches an angular position corresponding to the freewheeling angle, one of the switches, for example 21, is turned off. Consequently, the current flowing through the phase winding will continue to flow, but will now flow through only one of the switches (in this example 22) and through only one of the diodes 23/24 (in this example 24). During the freewheeling period, the voltage drop across the phase winding is small, and the flux remains substantially constant. The circuit remains in this freewheeling condition until the rotor rotates to an angular position known as the "turn-off angle", $\theta_{off}$ (e.g. when the centre-line of the rotor pole is aligned with that of the stator pole). When the rotor reaches the turn-off angle, both switches 21 and 22 are turned off and the current in phase winding 23 begins to flow through diodes 23 and 24. The diodes 23 and 24 then apply the DC voltage from the DC link in the opposite sense, causing the magnetic flux in the machine (and therefore the phase current) to decrease. This continues until the current drops to a level where the diode becomes reverse biased again and current flow ceases.

It is known in the art to use other switching angles and other current control regimes. Similarly, many other configurations of lamination geometry, winding topology and switching circuitry are known in the art, some of which are discussed in the Stephenson & Blake paper cited above.

As the speed of the machine rises, there is less time for the current to rise to the chopping level, and the drive is normally run in a "single-pulse" mode of operation. In this mode, the turn-on, freewheel and turn-off angles are chosen as a function of, for example, speed and load torque. Some systems do not use an angular period of freewheeling, i.e. switches 21 and 22 are switched on and off simultaneously. It is well known that the values of turn-on, freewheel and turn-off angles can be predetermined and stored in some suitable format for retrieval by the control system as required, or can be calculated or deduced in real time.

It will be noted that, in both the chopping and single-pulse modes of operation, the current in the phase windings of these switched reluctance machines is unidirectional. It will also be noted that the windings of the switched reluctance machine are electrically isolated from each other.

In many applications for electrical machines, there is a requirement to evaluate the health of the insulation system while the machine is operating. It is a relatively simple matter to measure the insulation resistance when the machine is not in use, and there is a well-established range of test methods for this procedure. However, doing it when the machine is operating is significantly more difficult.

Figure 4:
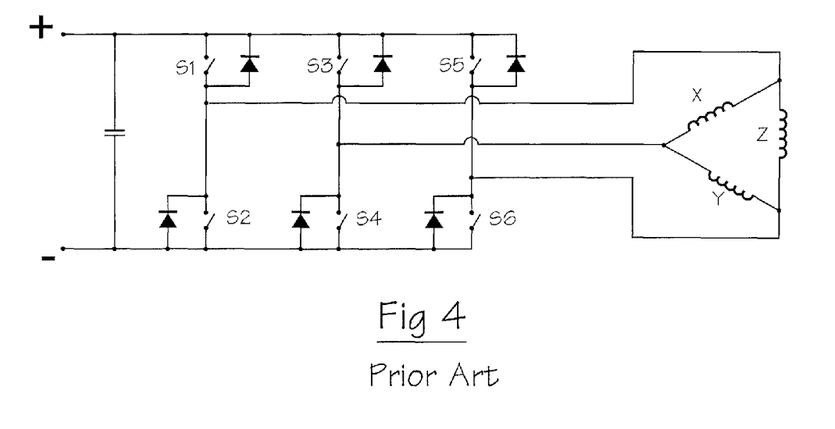
FIG. 4 shows a typical example of an induction machine connected to a 3-phase, symmetrical bridge inverter.

The problem has been solved for induction and synchronous machines by taking advantage of the way in which these machines are connected to be driven from an inverter. FIG. 4 shows a typical example of an induction machine connected to a 3-phase, symmetrical bridge inverter. The three phase windings X, Y, Z are connected in a delta fashion and the common points are connected to the centre point of the three phase legs of the inverter. In operation, the switches are operated in pairs S1/S4, S3/S6, S5/S2 to apply a stepped voltage waveform to the windings. The arrangement is characterised by the phase currents being bi-directional and by each winding always being connected to the DC link throughout the cycle.

Insulation faults in these drive systems can be monitored by applying a relatively small voltage between the DC link and the ground, or "earth" of the complete system. In order to avoid difficulties with capacitances between the link and ground, some systems use an alternating voltage superimposed between the DC link and ground. Various processing systems have been developed to interpret the measurements, some using statistical methods to remove the effects of measurement noise. For example, U.S. Pat. No. 9,069,025 discloses methods suitable for use with an AC induction motor, where the machine windings are fed from a symmetrical bridge converter and are always connected via a switch to the DC link.

Typically, the monitoring techniques have to filter out unwanted noise in the signals and achieve this by using relatively low-frequency AC voltages and averaging algorithms which extend over several cycles of the operation of the drive. It follows that none of these systems are suitable for use with switched reluctance systems, since there are significant periods during an electrical cycle of the switched reluctance system when the phase windings are not connected to the DC link. The insulation detection system "sees" a pattern of connection and disconnection to the DC link, in both chopping and single-pulse modes, which makes it impossible to monitor the insulation of the system. There is therefore a need for a method of operation of a switched reluctance system which will allow monitoring of insulation levels while the system is operating.

The present invention is defined in the accompanying independent claims. Preferred features of the invention are recited in the claims respectively dependent thereon.

In some aspects, there is provided a method of operating a 2-switch-per-phase power converter for a switched reluctance machine, i.e. a power converter having two switches per phase, one each side of the respective phase winding, in parallel with a corresponding diode of a pair of diodes, one each side of the respective phase winding. The method comprises keeping both switches of a phase closed for a first period within a phase cycle of the phase to connect a phase winding to a DC link. Subsequent to the first period, both switches of the phase are opened for a second period within the phase cycle and any current in the phase winding is allowed to decay to zero. After that, one of the switches of the phase is closed to connect the winding to the DC link for a third period during which no current flows in the phase winding.

The method of operation adds a period of time in which one of the switches of the phase is closed after current has ceased to flow subsequent to opening both switches, i.e. subsequent to de-energisation of the phase winding. Doing so does not cause any currents to flow in the phase winding but re-establishes an electrical connection with the phase winding, thus enabling the health of the phase winding, in particular insulation levels, to be monitored subsequent to de-energisation of the phase.

In some embodiments, the method comprises keeping the one of the switches closed at the end of the third period and closing the other one of the switches at the start of the first period of the next phase cycle, thereby starting the first period of the next phase cycle immediately as the third period ends. For example, the third period may substantially fill the interval between the second period and the first period of the next phase cycle.

In some embodiments, the method comprises freewheeling the phase for a fourth period between the first and second period. The periods (first, second and third or first, second, third and fourth, as the case may be) may substantially fill the phase cycle.

In some embodiments, the method comprises monitoring insulation integrity of the phase during the periods.

In some aspects, there is provided a switched reluctance drive system comprising a switched reluctance machine, a controller, and a 2-switch-per-phase power converter coupled to one or more phase windings of the switched reluctance machine, wherein the controller is coupled to the power converter to control power being supplied to the one or more phase windings and wherein the controller is configured to implement the method of the embodiments described above.

BRIEF DESCRIPTION OF THE DRAWINGS

These and other aspects and advantages of the invention will become apparent upon reading the following detailed description of exemplary embodiments of the invention and upon reference to the accompanying drawings, in which.

DETAILED DESCRIPTION

Figure 5A:
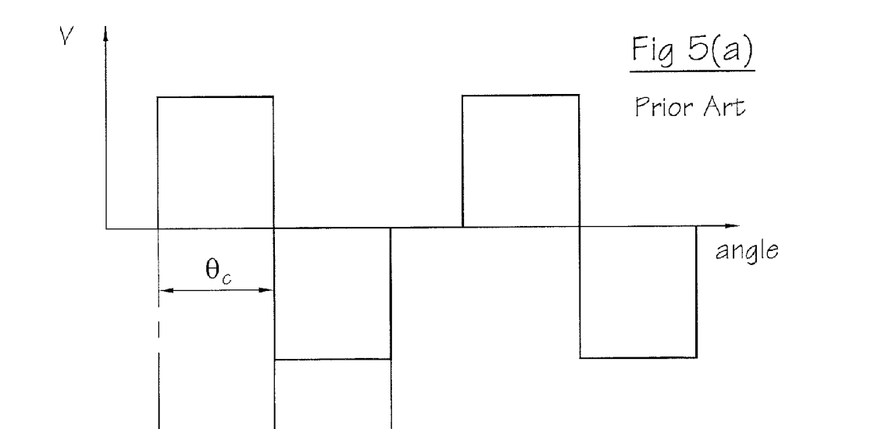
FIGS. 5a, 5b, and 5c show voltage and current waveforms for a phase winding of a switched reluctance machine in single-pulse mode.
Figure 5B:
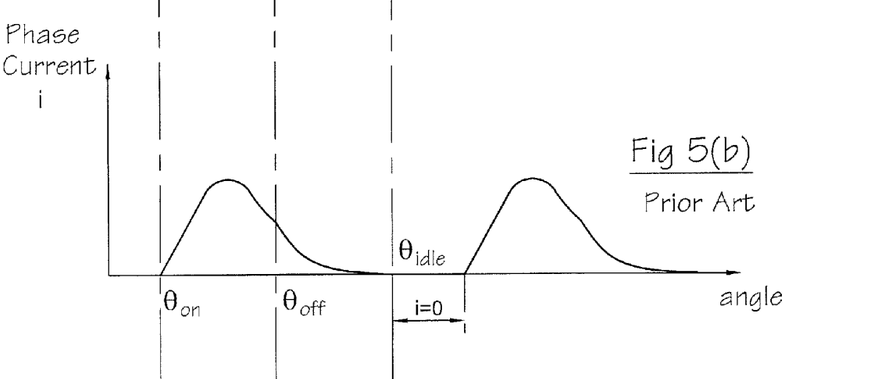
Figure 5C:
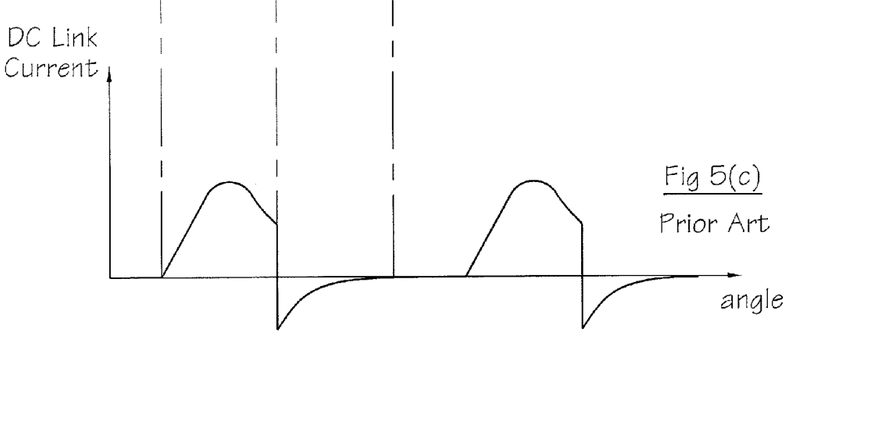

FIGS. 5a-5c show the typical energisation scheme for single-pulse operation of a switched reluctance machine, as described in Stephenson and Blake above. The DC link voltage is applied at a predetermined rotor angle $\theta_{on}$, shown in FIG. 5(b) by closing both switches 21, 22. The application continues during the conduction angle $\theta_c$ until the switch-off angle $\theta_{off}$, when the switches are opened and the current flows through the diodes 23, 24 back to the DC link. During this period of decaying current, energy is returned to the DC link. While the current in the phase winding is unidirectional, as shown in FIG. 5(b), the current in the DC link is bi-directional. Current continues to decay until the diodes 23, 24 become reverse biased and current flow ceases at $\theta_{idle}$.

There is then a period, as shown in FIG. 5(b) where there is no current flowing and the winding is isolated from the DC link.

Figure 6A:
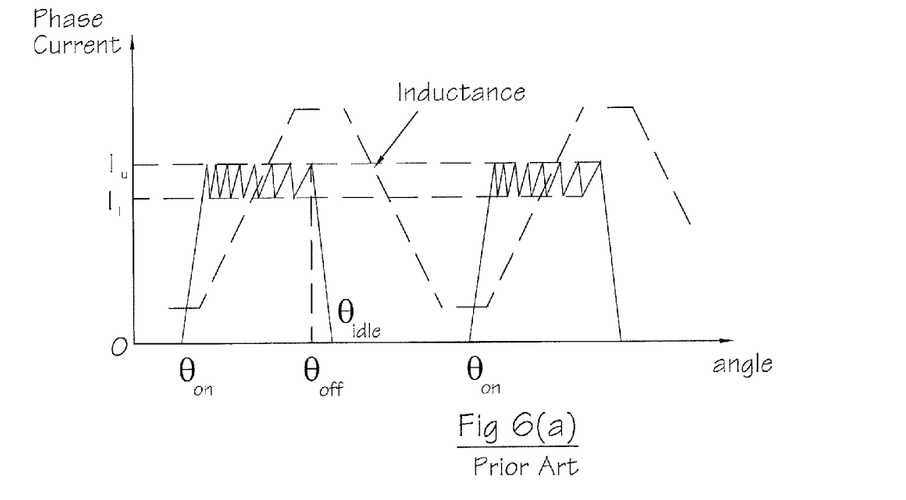
FIGS. 6a, 6b show current waveforms for a phase winding of a switched reluctance machine in chopping mode.
Figure 6B:
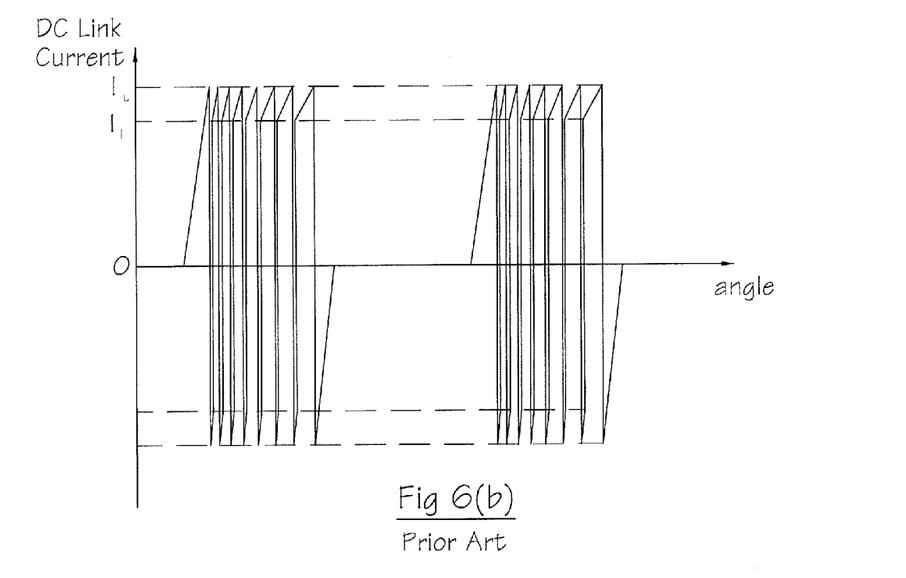

FIGS. 6a and 6b show corresponding operation in the chopping mode. It is common for the conduction to start at $\theta_{on}$ in the centre of the minimum inductance region and to end at $\theta_{off}$ in the centre of the maximum inductance region, as shown in FIG. 6(a). Between these two points, the current is allowed to cycle between upper and lower hysteresis levels $I_u$, $I_l$. The period of disconnection from the DC link often approaches 50% of the overall cycle. The DC link current is shown in FIG. 6(b). As in FIGS. 5a and 5b, there is a significant period during which the phase is not connected to the DC link between $\theta_{idle}$ and $\theta_{on}$.

It is well-known, as described above and in Stephenson, to interpose a short period of freewheeling starting at a freewheel angle $\theta_{fw}$ between $\theta_{on}$ and $\theta_{off}$, that is, between the conduction period and the energy return period, often for reasons of noise or torque ripple control. While effective to ameliorate these problems, this technique does not help with detection of insulation faults, as there are still long periods where the winding is not connected to the DC link.

Inspection of the asymmetrical bridge circuit shown in FIG. 2 shows that, if the phase winding has no current flowing in it, it is possible to close, say, the lower switch 22 (leaving the upper switch 21 open) without provoking any current to flow. This is because the upper switch 21 is open and the diodes are reverse biased. Nevertheless, the winding is now connected to the DC link, so it is possible now to monitor the integrity of the insulation. The same applies, of course, to closing the upper switch 21 while leaving the lower switch 22 open.

In principle, the winding can therefore be connected continuously to the DC link throughout the electrical cycle, either through the switches in the conduction period, the diodes during the energy return period or a single switch during the idle period between the current reaching zero at an angle $\theta_{idle}$ and the next energisation at $\theta_{on}$. In practice, it may be prudent to insert a very short gap after the energy return period to ensure that all the phase current has decayed to zero before closing the switch, but the gap can be small compared to the overall cycle and can be of negligible effect.

It is therefore possible to modify the conventional operation of a switched reluctance machine controller so that, by closing a switch which would otherwise be open, it is possible to allow the integrity of the insulation of the system to be monitored. This monitoring can be done in any of the known ways, for example as described in U.S. Pat. No. 9,069,025.

Figure 7:
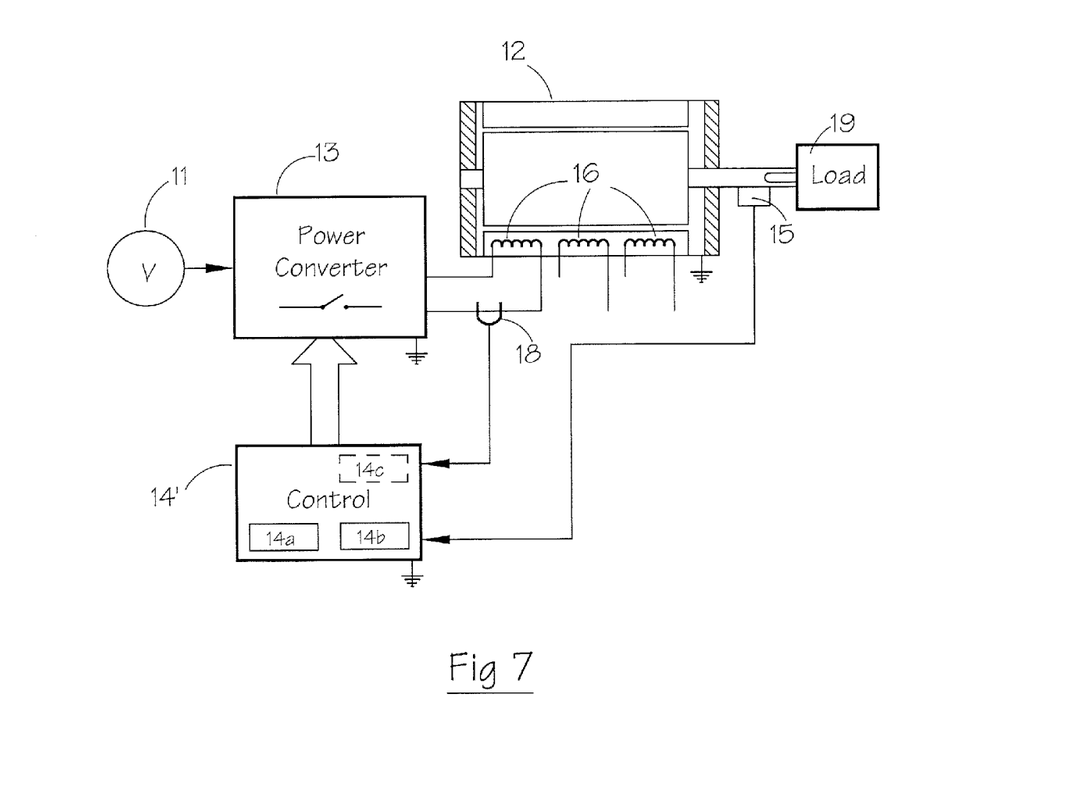
FIG. 7 shows the principal components of a switched reluctance drive system in accordance with an embodiment.

With reference to FIG. 7, a switched reluctance drive system in accordance with an embodiment comprises a controller 14' having an insulation integrity monitoring module 14a and a switching module 14b adapted to facilitate monitoring of the integrity of the insulation of the system. Otherwise, the system is configured as described above with reference to FIG. 1. In particular, the machine 12 is configured as described above with reference to FIG. 2, with switches 21 and 22 and current return diodes 24 and 23 on either side between a phase winding 16 and voltage rails 26 and 27. As described above, the insulation integrity monitoring module 14a is adapted to monitor the integrity of the insulation of the system by applying a small current (AC or DC) between the DC link 25 and ground.

In some particular embodiments, the module 14a is configured to implement a monitoring method as described in U.S. Pat. No. 9,069,025, which is hereby incorporated by reference in its entirety. In other embodiments, module 14a can be located remotely from the other components of the controller 14'.

Figure 8:
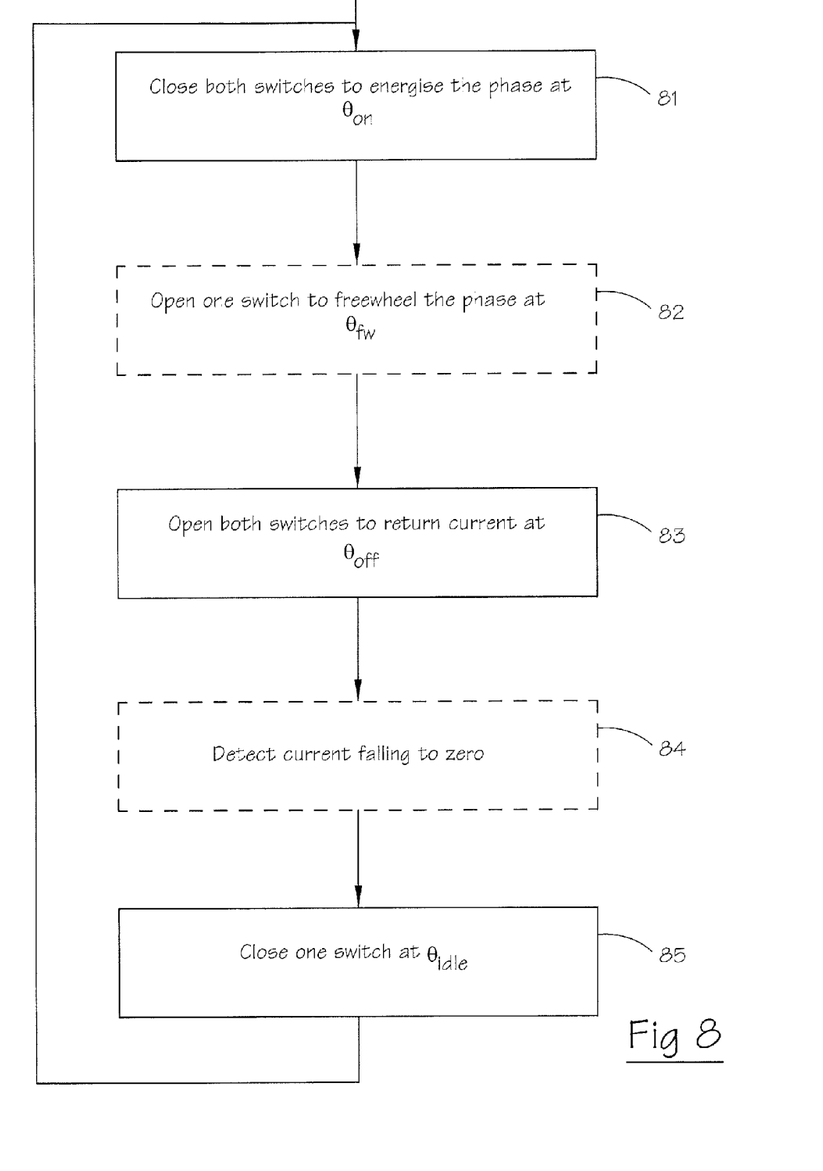
FIG. 8 shows a flowchart describing a method of operating a switched reluctance drive system in accordance with an embodiment.

With reference to FIG. 8, the switching module 14b is now described in further detail. The switching module 14b is configured to operate the switches 21, 22 as follows below.

At step 81, the switching module 14b causes both switches of a phase to be energised at the switch-on angle $\theta_{on}$ for that phase. The phase is then energised either in chopping or single pulse mode as described above. Subsequently, in some embodiments, at an optional step 82, the switching module 14b causes one of the switches to open to freewheel the phase starting at the freewheel angle $\theta_{fw}$. Subsequently (or immediately after the conduction period starting at $\theta_{on}$ in embodiments where there is no freewheeling) a switching module 14b causes both switches to open at the switch-off angle $\theta_{off}$ to return current (step 83). Both switches remain open until the current has effectively decayed to zero. Subsequently, at $\theta_{idle}$, one of the two switches is closed again, which results in the phase in question being connected again to the voltage supply without any current flow being caused (step 85). Finally the switching module 14b loops back to step 81 and both switches are closed (that is, the switch left open at step 85 is also closed) at $\theta_{on}$ of the next phase cycle (step 81).

In some embodiments, $\theta_{idle}$, the angle at which one switch is closed subsequent to energy return, is fixed for a given operating condition in a similar manner as $\theta_{on}$, and $\theta_{off}$ (as well as $\theta_{fw}$ in embodiments which use freewheeling), as a function of the drive's operating condition, such that current will have effectively decayed to zero at $\theta_{idle}$. The parameters that may be used in this determination may include one or more of rotor speed, phase current, phase voltage, phase flux, current or torque command, etc. In other embodiments, a fixed value of $\theta_{idle}$ is used, chosen such that current will have decayed to zero in the phase at that point for the range of rated operating conditions of the drive. In yet further embodiments, an additional, optional step 84 is inserted between steps 83 and 85, at which a phase current is monitored to determine the point in the phase cycle when current has actually decayed to zero (or substantially to zero) and to close one of the switches in response to the detector 14c output, thus in effect setting $\theta_{idle}$ dynamically.

It will be appreciated that, in accordance with the above embodiments, the phase winding will be connected to the DC link substantially during the entire period from when current decays to zero and the diodes 23 and 24 become reversed biased until the switches are closed again at angle $\theta_{on}$, that is substantially the entire time between the energy return period starting at $\theta_{off}$ and the next conduction period starting at $\theta_{on}$. Thus, the phase will be connected to the DC link substantially over the entire phase cycle during the phase conduction period, freewheeling period (where used), energy return period and idle period starting at $\theta_{idle}$, thereby enabling the insulation integrity monitoring module 14a to monitor the integrity of the insulation over substantially the entire phase cycle. Similarly, the idle period starts when the current has decayed substantially to zero such that there are no undesirable effects on machine performance from any residual current there may be, such as noticeable torque ripple or noise associated with any corresponding residual torques.

While the above description has been made in the context of monitoring the integrity of the insulation of phase windings, it will be appreciated that there may be other contexts in which it may be useful to maintain a connection between the DC link and phase winding over substantially the entire phase cycle. Likewise, it will be appreciated that the benefits of the disclosed invention also accrue where the idle period with one switch open and one switch closed subsequent to energy return extends the period of connection of the phase winding to the DC link over prior art approaches without extending this over the entire phase cycle, for example where both switches are opened again prior to the next switch-on angle $\theta_{on}$.

The skilled person will appreciate that variation of the disclosed arrangements are possible without departing from the invention. Accordingly, the above description of embodiments is made by way of example and not for the purposes of limitation. It will be clear to the skilled person that minor modifications can be made to the arrangements without significant changes to the operation described above. The present invention is intended to be limited only by the scope of the following claims.

The invention claimed is:

1. A method of operating a 2-switch-per-phase power converter for a switched reluctance machine, the method comprising:
    keeping both switches of a phase closed for a first period within a phase cycle of the phase to connect a phase winding to a DC link;
    subsequent to the first period, opening both switches of the phase for a second period within the phase cycle and allowing any current in the phase winding to decay to zero; and
    thereafter closing one of the switches of the phase to connect the winding to the DC link for a third period during which no current flows in the phase winding.

2. A method according to claim 1, comprising keeping the one of the switches closed at the end of the third period and closing the other one of the switches at the start of the first period of the next phase cycle, thereby starting the first period of the next phase cycle immediately as the third period ends.

3. A method according to claim 1, wherein the third period substantially fills the interval between the second period and the first period of the next phase cycle.

4. A method according to claim 1, comprising freewheeling the phase for a fourth period between the first and second period.

5. A method according to claim 1, wherein the periods substantially fill the phase cycle.

6. A method according to claim 1, comprising monitoring insulation integrity of the phase during the periods.

7. A switched reluctance drive system comprising:
    a switched reluctance machine;
    a controller;
    a 2-switch-per-phase power converter coupled to one or more phase windings of the switched reluctance machine, wherein the controller is coupled to the power converter to control power being supplied to the one or more phase windings and wherein the controller is configured to:
    keep both switches of a phase closed for a first period within a phase cycle of the phase to connect a phase winding to a DC link;
    subsequent to the first period, open both switches of the phase for a second period within the phase cycle to allow any current in the phase winding to decay to zero; and
    thereafter close one of the switches of the phase to connect the winding to the DC link for a third period during which no current flows in the phase winding.

8. A switched reluctance drive system according to claim 7, wherein the controller is configured to keep the one of the switches closed at the end of the third period and close the other one of the switches at the start of the first period of the next phase cycle, thereby starting the first period of the next phase cycle immediately as the third period ends.

9. A switched reluctance drive system according to claim 7, wherein the third period substantially fills the interval between the second period and the first period of the next phase cycle.

10. A switched reluctance drive system according to claim 7, wherein the controller is configured to freewheel the phase for a fourth period between the first and second period.

11. A switched reluctance drive system according to claim 7, wherein the periods substantially fill the phase cycle.

12. A switched reluctance drive system according to claim 7, wherein the controller is configured to monitor insulation integrity of the phase during the periods.

13. A switched reluctance drive system according to claim 7, wherein the controller is configured to open and/or close the switches based on parameters of the switched reluctance machine comprising one or more of a rotor speed, a phase current, a phase voltage, or a phase flux, wherein the phase flux comprises a magnetic flux of the phase winding.

14. A switched reluctance drive system according to claim 13, further comprising a current transducer configured to provide electrical signals associated with the phase current to the controller.

15. A switched reluctance drive system according to claim 7, wherein the controller determines a duration of one or more of the first, the second, and/or the third period of the phase cycle based on rated operating conditions comprising one or more of rotor speed, phase current, or phase voltage of the switched reluctance machine.

16. A switched reluctance drive system according to claim 7, further comprising a current transducer, coupled to the phase winding, configured to sense a current flowing in the phase winding and provide an electrical signal to the controller, wherein the controller is configured to open and/or close one or more of the switches at least in part in response to the electrical signal.

\* \* \* \* \*